United States Patent
Tautz et al.

(10) Patent No.: US 7,815,038 B2
(45) Date of Patent: Oct. 19, 2010

(54) CONVEYING DEVICE FOR VERTICALLY TRANSPORTING PIECE GOODS

(75) Inventors: Frank Tautz, Rahden (DE); Carsten Brommer, Tecklenburg/Leeden (DE); Klaus Gerke, Bassum (DE)

(73) Assignee: Kolbus GmbH & Co. KG, Rahden (DE)

( * ) Notice: Subject to any disclaimer, the term of this patent is extended or adjusted under 35 U.S.C. 154(b) by 86 days.

(21) Appl. No.: 12/321,514

(22) Filed: Jan. 22, 2009

(65) Prior Publication Data

US 2009/0200140 A1 Aug. 13, 2009

(30) Foreign Application Priority Data

Feb. 7, 2008 (DE) ........................ 10 2008 008 009

(51) Int. Cl.
*B65G 17/16* (2006.01)
(52) U.S. Cl. ..................................... 198/799; 198/475.1
(58) Field of Classification Search .............. 198/475.1, 198/797, 799
See application file for complete search history.

(56) References Cited

U.S. PATENT DOCUMENTS

| | | | | | |
|---|---|---|---|---|---|
| 3,024,891 | A | * | 3/1962 | Sawrie | 198/799 |
| 3,184,039 | A | * | 5/1965 | Czarnecki | 198/799 |
| 3,223,260 | A | * | 12/1965 | Bright | 414/508 |
| 3,268,061 | A | * | 8/1966 | De Good et al. | 198/799 |
| 3,756,378 | A | * | 9/1973 | Kuehl et al. | 198/799 |
| 3,850,106 | A | * | 11/1974 | Krivec | 104/127 |
| 4,627,530 | A | * | 12/1986 | Franke | 198/799 |
| 5,263,574 | A | * | 11/1993 | Hix | 198/799 |
| 2004/0144624 | A1 | * | 7/2004 | Hornhofer | 198/799 |

FOREIGN PATENT DOCUMENTS

| | | |
|---|---|---|
| EP | 0 001 967 | 5/1979 |
| EP | 0 209 638 | 1/1987 |
| FR | 2 756 814 | 6/1998 |

OTHER PUBLICATIONS

European Search Report EP 09 00 1435, dated May 12, 2009.

* cited by examiner

*Primary Examiner*—Mark A Deuble
(74) *Attorney, Agent, or Firm*—Alix, Yale & Ristas, LLP

(57) ABSTRACT

A conveying device (1) for vertically transporting piece goods (3) with inner and outer conveying means (4, 5) and several platforms (11) that are coupled to the conveying means. The piece goods are fed to the platforms horizontally in a receiving region (14), the platforms lie horizontally while lifted in a lift region (12), and the platforms deliver the piece goods horizontally at a delivery region to a delivery conveyor (17). The conveying means are driven with a varying transport speed (F), such that the platforms pass through the deflecting region (6.2, 7.2) between the lift and discharge regions with a slower transport speed ($F_n$) while the platforms move with a faster transport speed ($F_h$) before and after they pass through the deflecting region. The varying transport speed (F) preferably has a period (P) which corresponds to the same mutual distance (T) between the platforms.

18 Claims, 2 Drawing Sheets

CONVEYING DEVICE FOR VERTICALLY TRANSPORTING PIECE GOODS

BACKGROUND

The present invention pertains to a conveying device for vertically transporting piece goods.

Two respective inner and outer conveying means endlessly circulate on partially congruent paths and are synchronously driven. The paths of the inner and outer conveying means are spaced apart from one another in an essentially vertical strand. Several platforms are coupled to the conveying means and essentially lie horizontally in the vertical strand. The piece goods are fed to the platforms horizontally by a first conveyor and the platforms deliver the piece goods horizontally to a second conveyor, situated forward of and at a different elevation than the first conveyor.

Conveying devices of this type are also referred to as vertical circulating elevators, elevators or rack conveyors and disclosed in DE 11 71 814 B and DE 38 33 750 A1. As described in the aforementioned documents, they may be realized in the form of S-conveyors, in which the delivery direction is identical to the feed direction, or in the form of C-conveyors, in which the piece goods are delivered opposite to the feed direction, as illustrated and described in DE 195 30 288 A1. The piece goods can be transported upward or downward with these conveying devices.

In such conveying devices, link chains are used as inner and outer conveying means while an elevator with a toothed belt is illustrated and described in DE 39 15 074 A1. The deflecting elements in the paths of the inner and outer conveying means consist of deflection pulleys. The inner and outer conveying means are continuously driven with a constant transport speed by means of a common drive shaft.

Due to the deflection from the horizontal transport direction into the vertical transport direction and vice versa, the platforms need to be mutually spaced apart by a distance that must be greater than the platform length plus the maximum piece good height to be transported in order to enable the platforms with the piece goods lying thereon to circulate in a collision-free fashion. This requires a relatively large cycle spacing in the supplied stream of products with correspondingly faster transport speeds in the conveying device and on the upstream and downstream transport systems.

Another disadvantage of known conveying devices can be seen in that the arc-shaped deflection into and out of the vertical strand and the centrifugal forces occurring during this deflection limit the transport capacity because the piece goods need to be prevented from shifting on the platforms. Otherwise, a fixed cycle sequence in the stream of products would be lost and the piece goods would have to be realigned relative to one another and rearranged in a cyclic fashion for subsequent processing. In the worst-case scenario, the piece goods would slide off the platforms in the deflecting region and fall into the conveying device. Piece goods that are transported in a stacked fashion would fall apart or lose their alignment relative to one another. Shifting piece goods on the platforms may also lead to markings on sensitive surfaces, for example, on books or similar printed products. The described deficiencies can be observed, in particular, in the upper deflecting region. At this location, it may even occur that the piece goods are lifted off the platforms at an excessively high speed.

SUMMARY

The object of the present invention is to vertically transport piece goods in such a way that a careful treatment of the piece goods is ensured at a high conveying capacity.

According to the present disclosure, this objective is attained in that the conveying means are driven with a varying transport speed, wherein the platforms pass through at least the deflecting region that forms the upper end of the vertical strand or region with a slower transport speed while the platforms move with a faster transport speed before and after they pass through that deflecting region.

The continuous speed of the platforms thusly can be limited to such a degree in the deflecting region that the piece goods do not lift off or even just shift on the platforms. The subsequent acceleration to faster transport speeds makes it possible to increase the throughput and therefore the conveying capacity of the conveying device because the average transport speed is faster than the constant transport speed according to the prior art. The smaller the height to be overcome and the mass to be moved, the more dynamically the conveying means with the platforms coupled thereto can be moved in a varying fashion such that a significant capacity increase can be achieved, particularly over small conveying heights.

BRIEF DESCRIPTION OF THE DRAWING

The characteristics and advantages of the present invention are described below with reference to one preferred embodiment that is illustrated in the enclosed drawing, in which.

DETAILED DESCRIPTION

Figure 1:
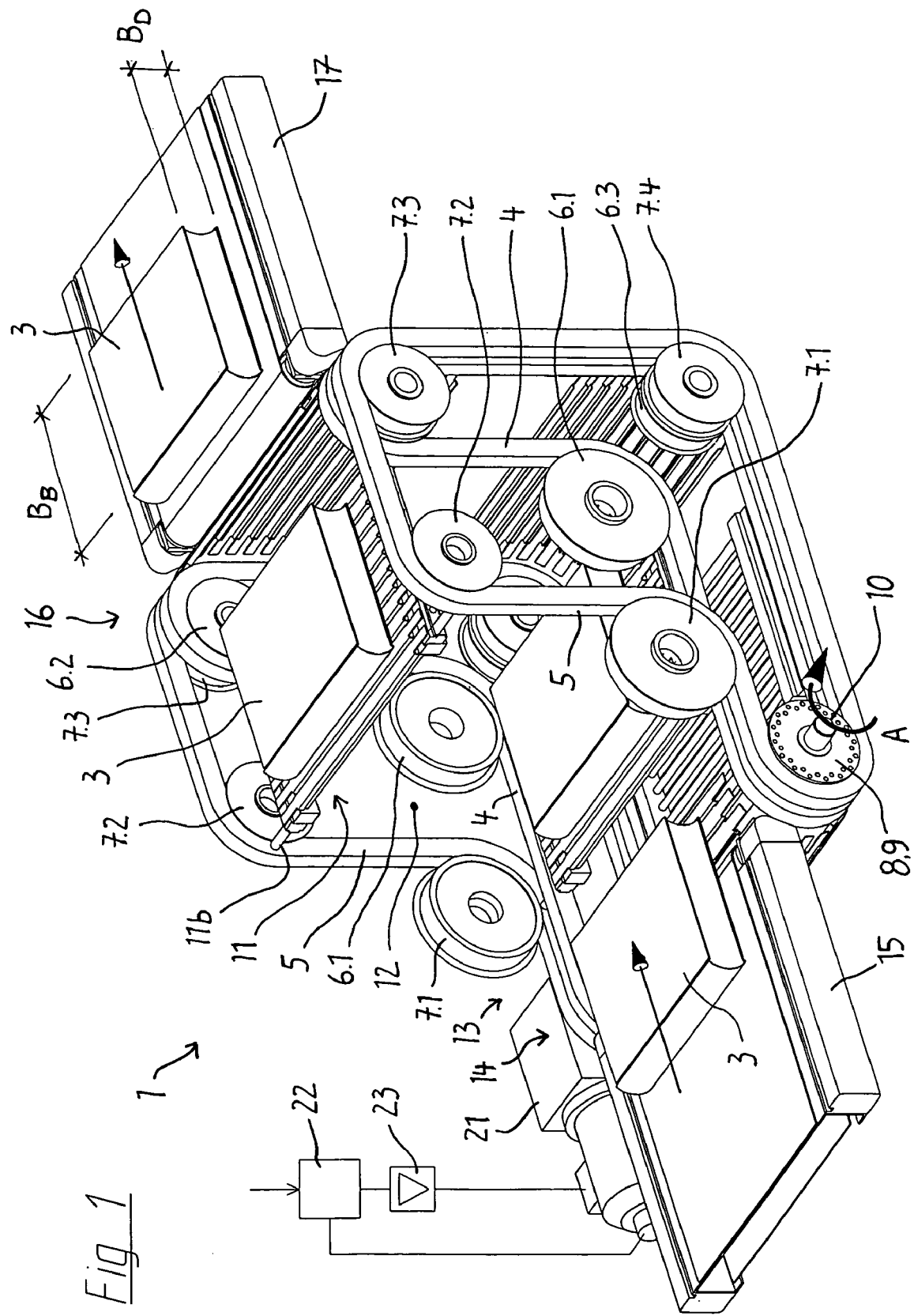
FIG. 1 shows a perspective representation of a vertical conveying device 1 with platforms that circulate in an S-shaped fashion.

The conveying device 1 transports piece goods such as, e.g., books 3 in a forward direction and to a different elevation, from a lower transport path to an upper transport path or vice versa, wherein the books 3 are always oriented horizontally. As used herein "book products" includes all varieties of bound printed products in any stage of manufacture, including signatures, book blocks, bound books, magazines, brochures, and the like. The conveying device 1 includes four conveying means in the form of toothed belts 4, 5 that endlessly circulate in parallel planes and on which several platforms 11 are arranged such that they are equidistantly spaced apart by a distance T. The respective inner toothed belts 4 and the respective outer toothed belts 5 have congruent paths while the inner and outer toothed belts 4, 5 are spaced apart from one another in the forward direction by a distance that approximately corresponds to the length $L_P$ of a platform 11 in a vertical strand 12.

The overall configuration can be understood as having a receiving region 14 adjacent the feed conveyor, a discharge region 16 adjacent the delivery conveyor, a lift region defined by the vertical strand 12 between the receiving region and the discharge region, whereby the piece goods are conveyed in a forward direction to a different elevation from the receiving region to the discharge region. The paths of the two inner conveying means 4 are congruent and the paths of the two outer conveying means 5 are congruent. The paths of the inner and outer conveying means 4, 5 are partially congruent, i.e., substantially horizontal and congruent in the receiving region and the discharge region but horizontally spaced apart in the vertical strand 12 by a distance that corresponds approximately to the length of a platform 11. The paths have a lower deflection region at a transition between the receiving region and the lift region and an upper deflection region at the upper end of the vertical strand 12 between the lift region and the discharge region. The platforms 11 move with the conveying means cyclically through the receiving, lower deflection, lift, upper deflection and discharge regions, and then a vertically oriented return region back to the receiving region.

The respective paths are defined by deflection pulleys 6.1 to 6.3 and 7.1 to 7.4 that are supported in a not-shown frame, wherein the toothed belts 4, 5 also travel over driving pulleys 8 and 9 that are arranged on a common drive shaft 10 in order to synchronously drive the inner and outer toothed belts 4, 5. The pulleys define respective deflection regions.

The platforms 11 are situated quasi between the inner toothed belts 4 and coupled to the outer toothed belt 5 on one end and to the inner toothed belt 4 on the opposed end as viewed in the forward direction. For this purpose, the inner and outer toothed belts 4 and 5 are connected to one another at the corresponding locations by means of rods 11 a, b that extend through the platforms 11.

The platforms 11 are realized flexible in a first, inwardly oriented direction (transverse to the forward direction) such that they can follow the path regions in which the inner and outer toothed belts 4, 5 are congruent. In a second, oppositely outwardly oriented direction, they are realized laterally stable such that they form a horizontal platform in the vertical strand 12.

The books 3 are horizontally received from a feed conveyor 15 in the receiving region 14 and horizontally delivered to a delivery conveyor 17 in the delivery region 16. In the described embodiment, the delivery direction is identical to the feed direction, which is why the conveying device 1 is also referred to as an S-conveyor. However, the path may also be configured such that the books 3 are delivered opposite to the feed direction. In this case, the conveying device would be referred to as a C-conveyor. The conveying device 1 makes it possible to transport books 3 upward as illustrated in FIGS. 1 and 2 or downward if the drive is reversed.

According to the invention, the toothed belts 4, 5 are driven with a continuously forward but varying transport speed F such that the platforms 11 pass through the upper deflecting region that is defined by the deflection pulleys 6.2, 7.2 with a slower transport speed $F_n$ while the platforms 11 move with a faster transport speed $F_h$ before and after they pass through this upper deflecting region.

Figure 3:
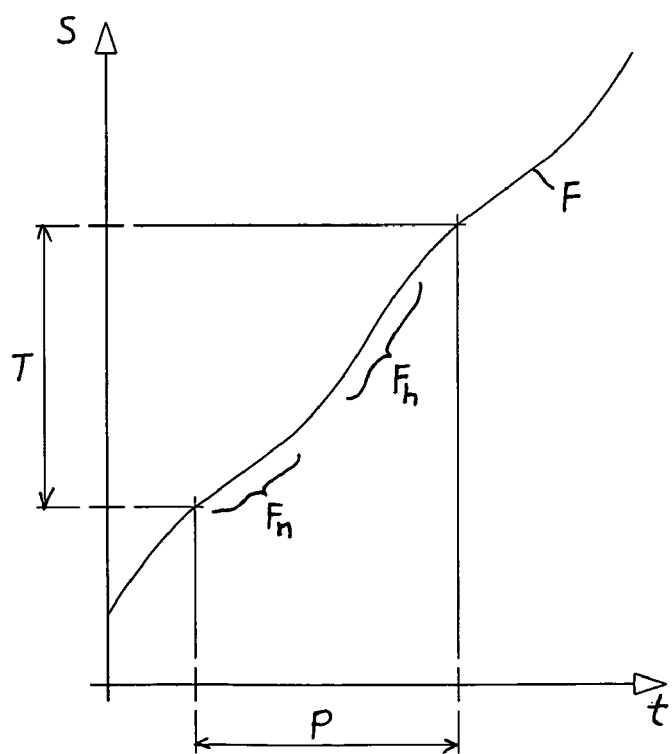
FIG. 3 shows a motion diagram for the circulating platforms.

FIG. 3 shows a motion diagram for the circulating platforms 11. Their transport path s is plotted as a function of the time t in this diagram. The slope of the curve reflects the respective transport speed F. The motion diagram comprises a period P that is identical to the mutual distance T between the platforms 11 with respect to the transport path traveled during this period. The slower transport speed $F_n$ is constant over a defined transport path that corresponds, e.g., to the arc length $L_B$ in this case.

Figure 2:
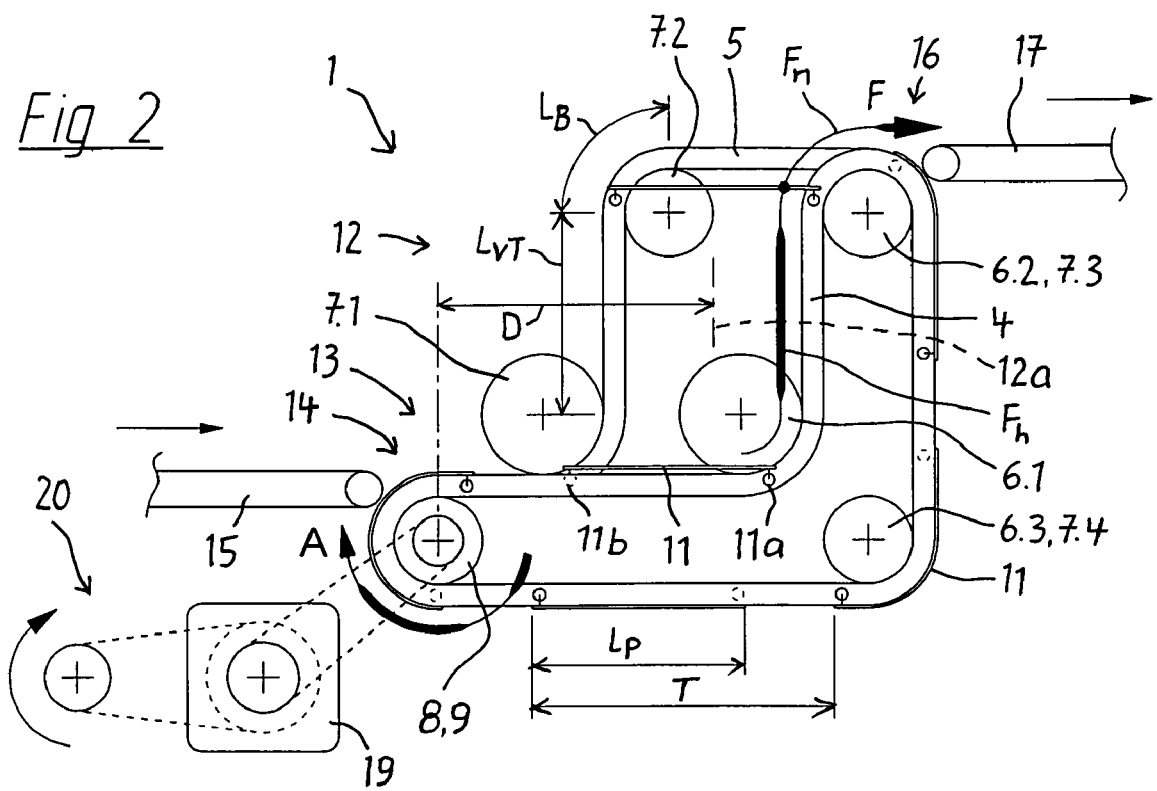
FIG. 2 shows a schematic section through the conveying device according to FIG. 1.

The varying transport speed can be realized in a cyclically precise and particularly simple fashion by providing a circulating cam mechanism 19 in the drive coupling 20 with a not-shown drive of the feed conveyor 15 and/or the delivery conveyor 17 in accordance with FIG. 2, wherein this circulating cam mechanism converts the constant driving motion of the feed or delivery conveyor into a varying driving motion A for the conveying device 1.

Alternatively, the drive of the toothed belts 4, 5 can also be realized with a separate or dedicated drive in the form of a geared servomotor 21 as shown in FIG. 1. The geared servomotor 21 can be variably controlled in accordance with the width $B_B$ of the book to be transported and/or the variations in the serially supplied product sequence on the feed conveyor such that the books 3 do not have to be supplied in a precisely spaced-apart fashion. The control is realized with a control unit 22, in which the rotational position of the servomotor 21 and therefore the respective position of the platforms 11, as well as different boundary conditions such as, for example, the book width $B_B$, the respective position of the supplied product, etc., are evaluated and processed in order to drive the geared servomotor 21 in accordance with a varying transport speed F by means of the assigned motor control 23.

In the conveying device 1, the mutual distance T between the platforms 11 and the length $L_{VT}$ of the vertical strand 12 are adapted to one another in such a way that the platforms 11 simultaneously pass through the lower deflecting region defined by the deflection pulleys 6.1 and 7.1 and the upper deflecting region defined by the deflection pulleys 6.2, 7.2 with a slower transport speed $F_n$. Consequently, a careful and flawless transport of the products is also ensured in the lower deflecting region. To this end, the length $L_{VT}$ of the vertical strand 12 plus the length of the arc $L_B$, through which the platforms need to pass in the upper deflecting region, should be realized approximately identical to a multiple of the mutual distance T between the platforms 11, wherein a single multiple is realized in the conveying device 1.

In the conveying device 1, a horizontal strand 13, in which the paths of the inner and outer conveying means 4, 5 are congruent, is provided in the receiving region 14, wherein the distance D between the rotational axis of the driving pulleys 8, 9 and the center axis 12 a of the vertical strand 12 is approximately identical to the mutual distance $L_P$ of the platforms 11. Consequently, the platforms move through the deflecting region defined by the driving pulleys 8, 9 with a slower transport speed $F_n$ such that the books 3 can be fed to the platforms 11 at this slower transport speed $F_n$. The cycle spacing and therefore the speed of the books 3 on the feed conveyor 15 and other upstream transport devices can be reduced in this fashion while the conveying capacity remains the same.

The invention claimed is:

1. A conveying device (1) for transporting piece goods (3) in a forward direction between horizontally and vertically spaced apart feed and delivery conveyors (15, 17), wherein said conveying device (1) comprises:
   a receiving region (14) adjacent the feed conveyor, a discharge region (16) adjacent the delivery conveyor, and a lift region (12) between the receiving region and the discharge region, whereby the piece goods are conveyed in the forward direction and vertically lifted from the receiving region to an upper end of the lift region (12) before entering the discharge region;
   two respective inner and outer conveying means (4, 5) and associated driver (19-23) that synchronously drives the conveying means on endlessly circulating transport paths, wherein the paths of the inner and outer conveying means (4, 5) are partially congruent but have spaced apart vertical strands in the lift region (12), and said paths have lower deflection regions (6.1, 7.1) at a transition between the receiving region and the lift region (12) and upper deflection regions (6.2, 7.2) at the upper end of the lift region;

a plurality of platforms (11) having opposite ends in the forward direction, with one end coupled to the inner conveying means (4) and the other end coupled to the outer conveying means (5) at the same mutual distance (T) from one another, wherein said platforms (a) are flexible in a first, inwardly oriented direction transverse to the forward direction and laterally stable in a second, oppositely outward oriented direction, (b) move with the conveying means cyclically through the receiving region, lower deflection region, upper deflection region and discharge regions, (c) lie horizontally in the lift region (12), (d) receive said piece goods horizontally from said feed conveyor (15) in the receiving region (14), and (e) discharge the piece goods (3) horizontally to said delivery conveyor (17) in the discharge region (16);

wherein said driver drives the conveying means with a continuously forward but varying transport speed (F), whereby the platforms (11) pass through at least the upper deflecting regions (6.2, 7.2) with a relatively slower transport speed ($F_n$) while the platforms (11) move with a relatively faster transport speed ($F_h$) before and after they pass through said upper deflecting regions.

2. The conveying device according to claim 1, wherein the varying transport speed (F) has a period (P) referred to the transport paths which corresponds to the mutual distance (T) between the platforms (11).

3. The conveying device according to claim 1, wherein the relatively slower speed ($F_n$) is constant over a defined transport path.

4. The conveying device according to claim 1, wherein the conveying means (4, 5) are driven by a mechanical transmission gear (19), in which the varying transport speed (F) is specifically defined.

5. The conveying device according to claim 1, wherein a controllable, dedicated driver (21) is assigned to the conveying means (4, 5).

6. The conveying device according to claim 5, wherein the transport speed (F) is adjustable in accordance with at least one of a length ($B_B$) of the piece goods in the forward direction and variations in piece goods carried serially on the feed conveyor.

7. The conveying device according to claim 1, wherein the respective platforms (11) pass through the deflecting regions (6.1, 7.1; 6.2, 7.2) substantially simultaneously with said relatively slower transport speed ($F_n$).

8. The conveying device according to claim 1, wherein the platforms receive the piece goods in the receiving region (14) as the piece goods (3) are fed to the platforms (11) at said relatively slower transport speed ($F_n$).

9. The conveying device according to claim 1, wherein the piece goods (3) are delivered by the platforms (11) in the delivery region (16) at said relatively slower transport speed ($F_n$).

10. The conveying device of claim 1, wherein the piece goods are in the form of at least one printed book product (3).

11. The conveying device according to claim 2, wherein the relatively slower speed ($F_n$) is constant over a defined transport path.

12. The conveying device according to claim 2, wherein the conveying means. (4, 5) are driven by a mechanical transmission gear (19), in which the varying transport speed (F) is specifically defined.

13. The conveying device according to claim 2, wherein a controllable, dedicated driver (21) is assigned to the conveying means (4, 5).

14. The conveying device according to claim 13, wherein the transport speed (F) is adjustable in accordance with at least one of a length ($B_B$) of the piece goods in the forward direction and variations in piece goods carried serially on the feed conveyor.

15. The conveying device according to claim 2, wherein the respective platforms (11) pass through the deflecting regions (6.1, 7.1; 6.2, 7.2) substantially simultaneously with said relatively slower transport speed ($F_n$).

16. The conveying device according to claim 2, wherein the platforms receive the piece goods in the receiving region (14) as the piece goods (3) are fed to the platforms (11) at said relatively slower transport speed ($F_n$).

17. The conveying device according to claim 11, wherein
the respective platforms (11) pass through the deflecting regions (6.1, 7.1; 6.2, 7.2) substantially simultaneously with said relatively slower transport speed ($F_n$);
the platforms receive the piece goods in the receiving region (14) as the piece goods (3) are fed to the platforms (11) at said relatively slower transport speed ($F_n$); and
the piece goods (3) are delivered by the platforms (11) in the delivery region (16) at said relatively slower transport speed ($F_n$).

18. The conveying device according to claim 17, wherein the relatively slower speed ($F_n$) is constant over a defined transport path.

* * * * *